July 23, 1935. C. DAUM 2,008,899
FRUIT JUICE EXTRACTOR
Filed May 23, 1930 2 Sheets-Sheet 1
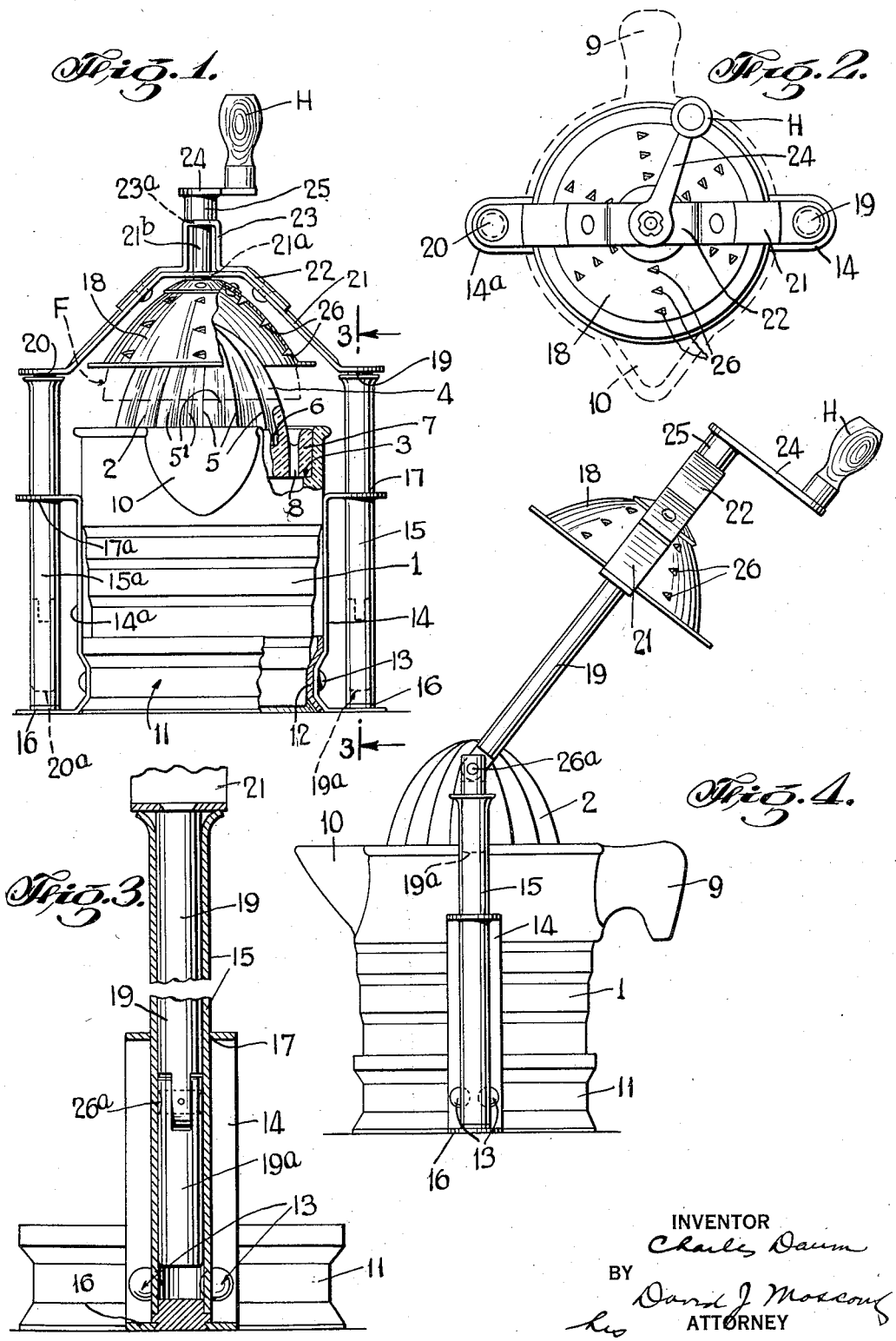
INVENTOR
Charles Daum
BY
David J. Moscow
ATTORNEY

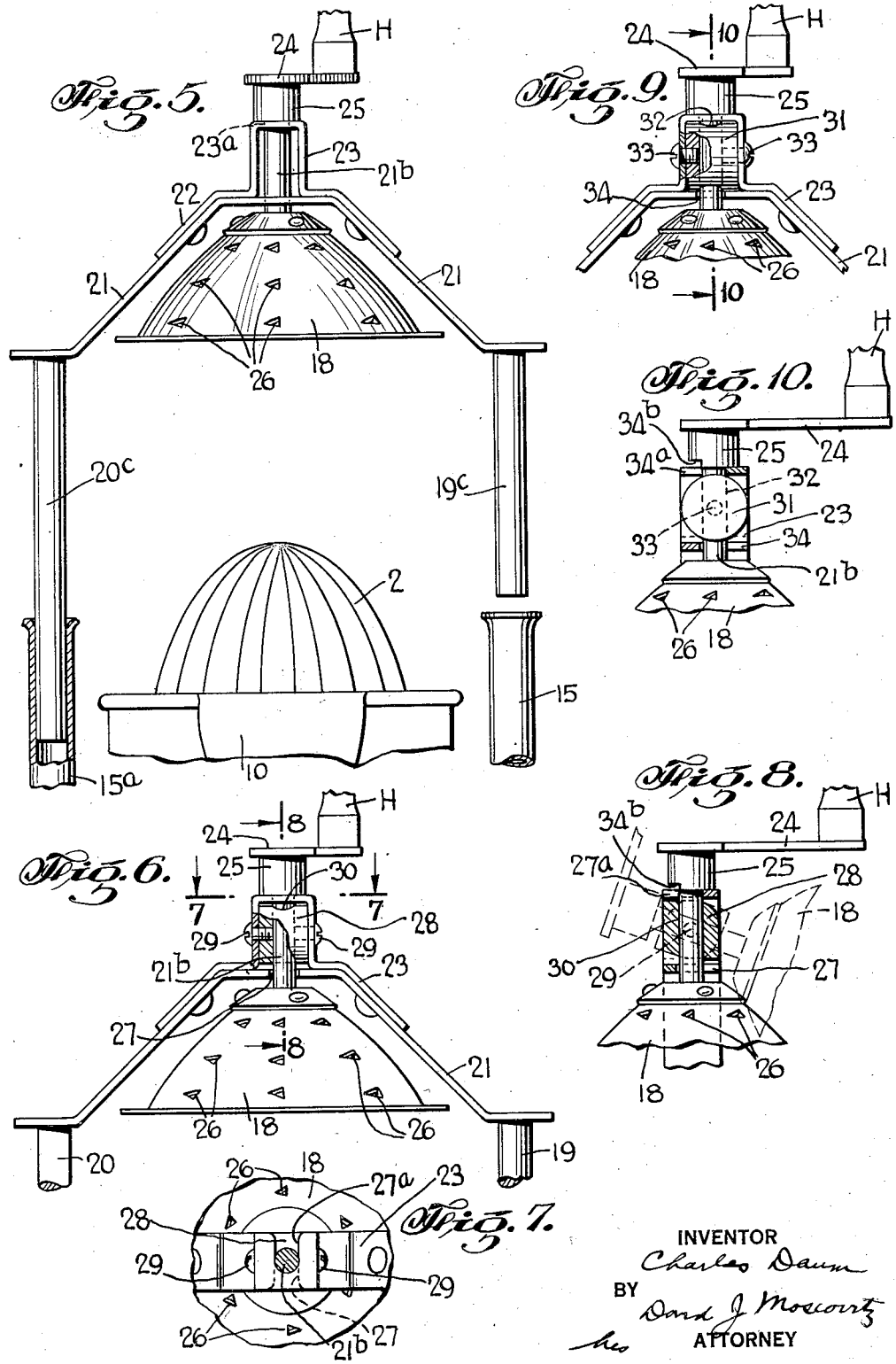

Patented July 23, 1935

2,008,899

UNITED STATES PATENT OFFICE 2,008,899

FRUIT JUICE EXTRACTOR

Charles Daum, New York, N. Y.

Application May 23, 1930, Serial No. 454,953

22 Claims. (Cl. 146—3)

This invention relates to improvements in fruit juice extractors, being more particularly directed to a device for extracting juices from fruits of the nature of oranges, lemons, limes, etc.

Up to the present time, there have been several forms of fruit extractors known to the public, such as, first, a hand extractor wherein a half of an orange, let us say, is pressed against a cone having ridges thereon, and the juice collected in a channel formed in the dish carrying such cone; secondly, devices have been known where the halved fruit is pressed against a rotating cone and the juice collected in a reservoir associated therewith; thirdly, other devices have been known where pulping or scraping action has been applied to the halved fruit by various mechanical expedients.

It is a part of this invention, however, to provide for a novel form of extracting mechanism wherein the elements composing the same are so formed as to provide for an extraction of the fruit juices from a halved fruit, firmly carried by a rotated mechanism, and pressing against the pulping cone fixed with respect thereto, and associated with a reservoir for carrying the extracted juices, the mechanism for supporting the fruit carrying element and the rotating members of the assembly being so formed as to be readily displaceable and removable into and out of operative position for the insertion of halved fruit, and the removal of such fruit when the juice thereof has been extracted by the mechanism.

Specifically, it is a part of this invention to provide for a fruit juice extractor, comprising of a frame having pillars associated therewith, such frame being adapted to carry a fruit juice receptacle and an extracting cone, and the pillars being hollowed in the form of tubular guides, so as to carry the supporting arms for the fruit carrying or impaling member, and the mechanism for rotating the same.

Still further, it is aimed to provide a novel form of fruit juice extracting mechanism, wherein the fruit carrying or impaling element and the mechanism for rotating such fruit carrying element are capable of displacement vertically, laterally, and angularly with respect to the ridged extracting cone used in such apparatus, so that when and as an extraction of fruit juice is to commence, or has been completed with respect to a halved fruit carried therein, such mechanism may be readily displaced, the fruit released, and the mechanism ready for the insertion of a new halved fruit, with a minimum of effort at a maximum of efficiency.

Still further, it is aimed to provide a fruit juice extractor, comprising a carrier for halved fruit, and the mechanism for rotating the same, in which such carrier and the rotating mechanism are displaceable vertically upwards, and either laterally circumferentially or angularly, so that the halved fruit, from which the juice has been extracted, may readily be removed, and the reservoir associated with the extracting cone and carrying the extracted juices may be readily removed or replaced, without affecting the structural assembly of the device.

Still further, it is aimed to provide for a novel mechanism associated with a fruit carrying or impaling element in a fruit juice extractor, and forming part of the rotating mechanism for the same, whereby such fruit carrying element may be angularly displaced in conjunction with or independently of the structure for vertically displacing the same, with respect to the extracting cone and reservoir carried in such extractor.

Still further, it is aimed to provide for a novel structural configuration of the fruit carrying mechanism in a fruit juice extractor, whereby the same may be lifted upwardly and angularly, and displace away from the frame work, extractor cone, and the reservoir associated therewith, but so displaced as not to be physically removed from the assembled structure when and as a halved fruit is to be removed and inserted.

These and other advantages, capabilities, and features of the invention will appear from the subjoined detailed description of one specific embodiment therefor illustrated in the accompanying drawings, in which Figure 1 is a front view of the completed fruit juice extractor assembly.

Figure 2 is a plan view of the same.

Figure 3 is a side elevation taken in section along lines 3—3 of Figure 1.

Figure 4 is a side elevation showing elements of the device partially displaced prior to use.

Figure 5 is a partial front view of a modified form of the extractor.

Figure 6 is a partial front view of a still further modified form of a fruit juice extractor.

Figure 7 is a plan view of the structure shown in Figure 6, and along lines 7—7 of Figure 6.

Figure 8 is a side elevation, partly in section, taken along lines 8—8 of Figure 6, with a showing in dotted lines, indicating the relative movement of the elements thereof.

Figure 9 is a partial front view of a still further modified form of fruit juice extractor.

Figure 10 is a side elevation, partially in section, along lines 10—10 of Figure 9.

Referring to the reference characters in the drawings, numeral 1 designates a fruit juice receptacle, which here is shown as being made of glass, and which has associated therewith a removable extractor head or cap 2 carried on shoulder 3, the said top having an extracting cone 4, provided with ribs 5 and ridges 5', and having their beginning at the outer circumference 6 of the cone, and terminating at the apex thereof, whereby to provide for a surface which will cause the maceration of the pulp of the fruit, and the extraction of the juices thereof, upon pressure and rotative contact therewith.

The extractor head 2 has a circular side wall 7 formed thereon, the bottom of which rests on the shoulder 3, and has provided between the periphery of said side wall and the periphery of said cone a number of openings 8, through which the juice extracted from the fruit during maceration may flow from the head into the receptacle. The receptacle has a handle 9, and a spout 10, through which the juices collected in the receptacle may be discharged without removing either the head or the other elements associated with the same in the extracting device.

The receptacle 1, carrying the head 2, is housed in an open ended circular base 11, formed of stamped metal, and having side walls 12, of the same contour as that of the lower portion of the receptacle, it being within the province of this invention to vary the shape and size of such base, so long as it may serve the purpose of removably carrying the receptacle, and the remaining mechanical elements associated therewith, and to be later described.

To the side walls 12 of the base 11, there is fastened, as by means of rivets 13, U-shaped arms 14 and 14a which serve as supports for the hollow tubes or pillars 15 and 15a, which form part of the supporting assembly for the mechanical elements associated with the receptacle and head carried thereby. The tubes 15 and 15a are held in vertical position by being fastened to the right-angular base portion 16 formed on the arms 14 and 14a, and being forced, fit into aperture 17 and 17a formed in the right-angular projections of the arms 14 and 14a, which are directly above and parallel to the base 16. An impaling member 18, comprising of a conical metal stamping, the mechanical details of which will be later described, is carried by a shaft 21b, supported for rotation on the frame or cross-arm 21 carried on telescoping bars 19 and 20. The said cross-arm has an opening 21a for receiving such shaft 21b, the cross-arm 21 being riveted or soldered to a cap 22, which has an up-struck rectangular shouldered portion 23, which portion 23 is provided with an opening 23a, associated with opening 21a on cross-arm 21, to form a two-point support to receive the shaft 21b.

The handle h is fastened to arm 24, which arm has a solid boss 25, in which boss the shaft 21b is fixed, such shaft being passed through the apertures 21a and 23a, so that the boss 25 actually rests on the shoulder portion 23, in this manner providing for the fastening of the impaling member 18 for rotation, and at the same time, for the support of the cross-arm 21 by the telescoping shafts 19 and 20, reciprocable within the hollow guide tubes 15 and 15a.

The impaling member 18 is disposed so as to have its surfaces substantially parallel to and at a distance from the projecting surfaces of the cone 3, and has formed therein a series of tangs 26, formed by the stamping out portions thereof inwardly along its body to pierce the skin of the fruit, thereby to cause the same to be restrained in position and to be directed in its movement in accordance with the displacement of the impaling member.

In order to raise the impaling member 18, the arm 24 is raised upwardly, and the cross-arm 21 carried thereby, and the telescoping shafts 19 and 20 are drawn upwardly, so that they may slide out of their respective tubes or guides 15 or 15a at the same time, so that when the fruit, as shown in the dotted lines of Figure 1, is raised above the top of the cone 3 on the head 2, the same may be readily removed from the impaling member 18 carrying the same.

In order that it will not be necessary to remove the telescoping arms 19 and 20 from the guide tubes 15 and 15a completely, or to support them while removing the fruit half, pivot joints 26a are provided, as shown in Figures 3 and 4, whereby the larger part of each of the telescoping members 19 and 20, to wit, 19a and 20a may be bent angularly of the shorter arms 19b and 20b, which remain in the tube guides 15 and 15a. Since the pivot joint is of the normal type used in mechanical movements of this nature, no detailed description of the elements forming the same will be given. In this manner, and by the use of such pivot joints, it is possible to raise impaling member to a certain height, (see Figure 4), and then swing the same angularly to left or right, for removing the fruit.

As shown in Figure 5, the telescoping members 19c and 20c are of unequal length, so that when the impaling member 18 is raised to a certain height, the telescoping arm 20c has still a portion of its length in the tube 15a, while the arm 19c is completely out of its guide tube 15, thereby making it possible to swing the impaling member 18 to the left or right, so as to remove the same and the fruit carried thereby from the range of the cone 3 on the head 2. It is to be noted that once the impaling member in the modification here shown is swung to the left or right, the complete assembly may be carried by arm 20c, which, when shifted downwardly, rests on the base, and remains fully within the guide tube 15a.

Modified forms of this invention are shown in Figures 6 to 10 inclusive, in which mechanisms are shown applied in association with shaft 21b, carrying the impaling member, whereby such shaft and the impaling member and the halved fruit carried thereby may be tilted angularly when such impaling member and the cross-arm 21, carrying the same, are lifted by withdrawal of the telescoping arms 19 and 20, for a short distance, sufficient so that the bottom surface of the halved fruit carried by the impaling member reaches a position above the apex of the cone 3, without further withdrawing the telescoping arms 19 and 20.

Referring to Figures 6 to 8 inclusive, there is provided, to co-operate with the cross-arm 21 and the upstruck shoulder 23, a rocker member 28, of rectangular configuration, but having opposing curved bearing surfaces 28a and 28b, which rocker member is pivoted within the shoulder 23 by means of screws 29, which pass through apertures in the opposite faces of the shoulder 23, such faces forming a bearing therefor. The shaft 21b passes through aperture 30 passing through the rocker arm from end to end, so as to provide a connection between the handle $h$ and the impaling member 18, means being provided for the angular tilting displacement of the shaft 21b through the formation of U-shaped apertures 27 and 27a formed respectively in the upper face of the shoulder and the face of the cross-arm 21 parallel thereto.

When it is desired to tilt the impaling member 18, as shown in the dotted lines of Figure 8, the arm 24 is pushed forward, shaft 21b then caused to clear the U-shaped apertures 27 and 27a, and the curved surfaces 28a and 28b caused to be disposed adjacent such U-shaped apertures, the screws 29 serving as the pivot of the rocker member in the shoulder.

Referring particularly to Figures 9 and 10, a modified form of rocker arm to provide a tilting action similar to that shown in Figures 6 to 8 inclusive is disclosed, such rocker arm 31 comprising of a cylinder having a central bore 32, through which shaft 21b passes, and being pivoted by screws 33 passing through apertures in the shoulder 23, there being provided U-shaped slots 34 and 34a in the shoulder and the cross-arm faces, in the same relation as described in the disclosure in Figures 6 to 8.

As shown in Figures 8 and 10, the boss 25 has a cutout portion 34b, so as to prevent contact of the surface of such boss with the upper surface of the shoulder 23, when the shaft 21b, carrying the impaling member 18, is tilted, (see the dotted lines showing in Figure 8).

Although the showing herein indicates specific structural formation and configurations of the several elements forming the completed assembly, it is within the province of this invention to vary and alter the sizes, shapes, and relative positions of the elements herein, so long as they may be operably connected to provide for the functions hereinabove described, and hereinafter claimed.

I claim:

1. A fruit juice extractor, comprising a base, a receptacle for fruit juice, removably carried in said base, upstanding hollow columns disposed on said base, an extracting cone disposed above said receptacle, and having apertures adjacent the same, through which juices may pass into said receptacle, a fruit impaling member supported above said base and disposed so as to position and carry a section of fruit into pressure contact with said extracting cone, a plurality of movable supports to which said impaling member is attached, said supports being adapted to be slidable within said hollow columns, whereby to allow for vertical displacement of said impaling member above said extracting cone.

2. A fruit juice extractor, comprising a base, a receptacle for fruit juice, removably carried in said base, upstanding hollow columns disposed on said base, an extracting cone disposed above said receptacle, and having apertures adjacent the same, through which juices may pass into said receptacle, a fruit impaling member supported above said base, and disposed so as to position and carry a section of fruit into pressure contact with said extracting cone, a plurality of movable supports to which said impaling member is attached said supports being slidable and guided within said hollow columns, said supports being capable of displacement vertically and angularly, whereby to permit of positioning of the impaling member away from said extracting cone.

3. A fruit juice extractor, comprising a base, a receptacle for fruit juices, carried in said base, an extracting cone disposed above said receptacle, hollow guide means upstanding on said base, an impaling member disposed above said extracting cone, a support for said impaling member slidable vertically within said guide means and means carried on said support and independently operable with respect thereto for angularly tilting said impaling member with respect to said base.

4. In a fruit juice extractor, a base, guide means upstanding on said base, an extracting cone, a receptacle for fruit juices directly below said extracting cone, an impaling member above said extracting cone, and means for carrying said impaling member, comprising of a series of elements slidable in said guide means and capable of causing said impaling member to be successively and independently displaced vertically and angularly with respect to said cone and receptacle, whereby to cause said impaling member to be removable from and capable of being disposed within the proximity of said extracting cone.

5. In a fruit juice extractor a base, a plurality of upstanding hollow columns supported by the base at opposite sides thereof, a receptacle for fruit juices removably carried in said base, a removable extracting cone disposed above and resting on said receptacle, said cone having apertures therein through which juices may pass into said receptacle, and a fruit impaling member, a support for said impaling member, said impaling member being mounted for rotation within said support and above said extracting cone, a plurality of posts fixed to said support and adapted to be reciprocated within said columns said columns serving as guides for said posts whereby the support and the impaling member may be urged towards the receptacle and the extracting cone carried therein during the fruit extracting process, and may be displaced in reverse direction when the extracting operation is complete.

6. In a fruit juice extractor, a stamped metal base having a plurality of upstanding hollow columns disposed in diametrically opposite sides thereof, a receptacle for fruit juices removably carried in said base, a removable extracting cone disposed above and resting on said receptacle, said cone having apertures therein through which juices may pass into said receptacle, a fruit impaling member disposed above said cone, said impaling member being mounted for rotation and angular displacement with respect to said support, a plurality of posts fixed at the extremities of said support and adapted to be reciprocated within said columns, said columns serving as guides for said posts whereby the support and the impaling member may be displaced in opposite directions with respect to the base and the extracting cone.

7. In a fruit juice extractor, a stamped metal base having a plurality of upstanding hollow columns disposed in diametrically opposite sides thereof, a receptacle for fruit juices removably carried in said base, a removable extracting cone disposed above and resting on said receptacle, said cone having apertures therein through which juices may pass into said receptacle, a fruit impaling member disposed above said cone, said impaling member being mounted for rotation with respect to said support, a plurality of posts fixed at the extremities of said support and adapted to be reciprocated within said columns, said columns serving as guides for said posts whereby the support and the impaling member may be displaced in opposite directions with respect to the base and the extracting cone, said posts being capable of angular displacement when a pre-determined length thereof has been withdrawn from the columns, whereby the support carrying the impaling member may be angularly displaced.

8. In a fruit juice extractor, a stamped metal base having a plurality of upstanding hollow columns disposed in diametrically opposite sides thereof, a receptacle for fruit juices removably carried in said base, a removable extracting cone disposed above and resting on said receptacle, said cone having apertures therein through which juices may pass into said receptacle, a fruit impaling member disposed above said cone, said impaling member being mounted for rotation and angular displacement with respect to said support, a plurality of posts fixed at the extremities of said support and adapted to be reciprocated within said columns, said columns serving as guides for said posts whereby the support and the impaling member may be displaced in opposite directions with respect to the base and the extracting cone, one of said posts being longer than the other, whereby, when the support has been raised a pre-determined distance the shorter post clears the top of its column, and the support is then rotatable about the longer post in its column as a pivot, whereby to permit insertion of sliced fruit.

9. In a fruit juice extractor, a stamped metal base having a plurality of upstanding hollow columns disposed in diametrically opposite sides thereof, a receptacle for fruit juices removably carried in said base, a removable extracting cone disposed above and resting upon said receptacle, said cone having apertures therein through which juices may pass into said receptacle, a support, and a fruit impaling member rotatably disposed in said support above said cone, a plurality of posts fixed in the extremities of said support and adapted to be reciprocated and guided within said columns, the support and impaling member carried thereby being adapted to be urged downwardly by pressure simultaneously with the impaling member, whereby fruit carried in said impaling member may be caused to be divested of its juices through pressure and rotative contact with the surface of the extracting cone.

10. In a fruit juice extractor, the combination of a rotary impaling member, a handle directly connected to said impaling member, a yoke for laterally supporting the same, an extracting member, and guides within which the depending legs of said yoke telescopically move during the juice extracting operation.

11. In a fruit juice extractor, the combination of a rotary impaling member, a handle directly connected to said impaling member, a yoke for supporting the same, an extracting member, and guides for said yoke laterally supporting the same and within which the depending legs of said yoke telescope while the impaling member is telescopically worked over said extracting member during the juice extracting operation.

12. In a fruit juice extractor, the combination of a rotary impaling member, a handle directly connected thereto, a yoke with depending legs movable as a unit for laterally supporting the same, an extracting member, and guides for said depending legs in working relation with said extracting member.

13. In a fruit juice extractor, the combination of a juice receiving cup, a rotary impaling member, a handle directly connected to said impaling member, means for supporting said impaling member over said cup, guiding means in working relation with said cup, and means depending from said supporting means cooperating with said guiding means to prevent lateral movement of said impaling member during the juice extracting operation.

14. In a fruit juice extractor, a rotatable impaling member, a handle directly connected to said impaling member, a juice receiving cup, an extracting member within said cup, a yoke laterally supporting said impaling member at its center, said yoke having two depending legs, and means in working relation with said cup telescopically guiding said depending legs so that said yoke supported impaling member may be worked down over said extracting member during the juice extracting operation.

15. In a fruit juice extractor including a juice receiving cup, an extractor member mounted therein, a fruit impaling member, a handle directly connected thereto, a yoke having depending legs rotatably carrying said impaling member and handle, the said yoke and impaling member being a separate unit from said cup, an extractor, and means cooperating with said depending legs centering said impaling member over said extractor member at the beginning of the juice extracting operation and providing a lateral supporting area which increases as said impaling member is worked over said extracting member during the remainder of the juice extracting operation.

16. In a fruit juice extractor, the combination of a rotatable impaling member, a crank directly connected thereto, an extracting member, a yoke with depending legs carrying said impaling member, guides associated with said extracting member, said yoke and said guides telescopically arranged to provide a lateral bearing surface for said depending legs, said bearing surface increasing as said impaling member approaches said extracting member.

17. In a fruit juice extractor, a receptacle, an extracting member mounted therein, a rotatable cap for engaging the fruit, means for rotating the cap so as to rotate the fruit over said extracting member, an arm supporting said cap so that it may be moved toward and away from said extracting member and having projecting means thereon, and means cooperating with the projecting means and with said receptacle so as to prevent lateral movement of the supporting arm during the juice extracting operation.

18. A compact fruit juice extractor comprising a juice receptacle, means attached to the receptacle for holding the same in the hand, a separate extracting member mounted therein, a rotatable cap, a shaft connected thereto, a crank secured to said shaft, an arm supporting said cap so that it may be moved toward and away from said extracting member, a two-point bearing for said shaft on said arm, projecting means on said arm, and means cooperating with the projecting means so as to prevent lateral movement of the supporting arm during the juice extracting operation.

19. A compact fruit juice extractor comprising a juice receptacle having a fixed position, a separate extracting member mounted within the receptacle, a rotatable cap, a shaft connected thereto, a crank secured to said shaft, and arms connected to the receptacle and the cap respectively, said arms cooperating whereby the cap may be moved to a position to permit the placing of fruit between it and the extracting member, and thereafter the cap and extracting member may be moved toward each other and then rotatively to each other to extract the fruit juice while at the same time they are moved telescopically of each other during the entire juice extracting operation, means forming a bearing of such character that the shaft and cap will not wobble in the rotative movement and means for guiding the up and down movements of said extracting member and preventing lateral movement of the arm connected to said cap.

20. A compact fruit juice extractor comprising a juice receptacle having a fixed position, a separate extracting member mounted within the receptacle, a rotatable cap for engaging the fruit and movable from a position above to a position surrounding the extracting member, means for rotating the cap over said extracting member, means comprising a pair of arms extending from beside and connected to the receptacle and cooperating to support the cap for the aforesaid movement, and means for guiding the travel of the cap in the aforesaid up and down movement.

21. A compact fruit juice extractor comprising a juice receptacle having a fixed position, a separate extracting member mounted within the receptacle, a rotatable cap for engaging the fruit and movable from a position above to a position surrounding the extracting member, means for rotating the cap over said extracting member, a frame connected to the receptacle and supporting the cap for the aforesaid movement, the frame being of such open construction that the fruit may be inserted between the cap and extracting member without detaching the cap or frame, and means for guiding the travel of the cap in the aforesaid up and down movement.

22. In a fruit juice extractor, a receptacle, an extracting member mounted therein, a rotary cap for engaging and rotating the fruit over the extracting member, means carrying said cap whereby the cap may be moved toward and away from said extracting member, a projecting leg on said means, and a guide for said leg associated with said receptacle.

CHARLES DAUM.